A. HUSTUS.
NOZZLE.
APPLICATION FILED MAY 1, 1913.

1,124,742.

Patented Jan. 12, 1915.

Witnesses:
Mary C. Smith.
Chas. F. A. Smith

Inventor:
Arthur Hustus,
by Walter E. Lombard.
Atty.

UNITED STATES PATENT OFFICE.

ARTHUR HUSTUS, OF BOSTON, MASSACHUSETTS.

NOZZLE.

1,124,742.  Specification of Letters Patent.  Patented Jan. 12, 1915.

Application filed May 1, 1913. Serial No. 764,921.

*To all whom it may concern:*

Be it known that I, ARTHUR HUSTUS, a citizen of the United States of America, and resident of Boston, in the county of Suffolk and State of Massachusetts, have invented certain new and useful Improvements in Nozzles, of which the following is a specification.

This invention relates to nozzles and particularly to that class of nozzles that are used on fire extinguishers and similar devices delivering through said nozzles a stream or spray of chemicals. The chemicals used are such as will act upon the metal of the nozzle and cause its corrosion, thus often preventing the operation of the nozzle when most needed.

One object of the present invention is to obviate this difficulty and produce a device which will be ready for operation at any and all times.

The invention consists in certain novel features of construction and arrangement of parts which will be fully understood by reference to the description of the drawings and to the claims hereinafter given.

Figure 2:
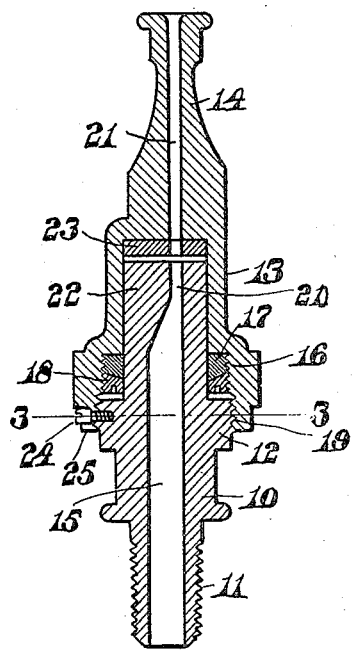
Figure 1:
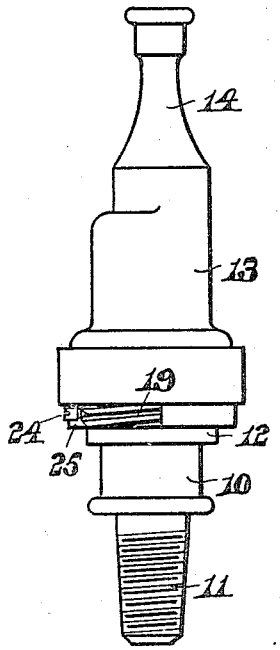
Figure 3:
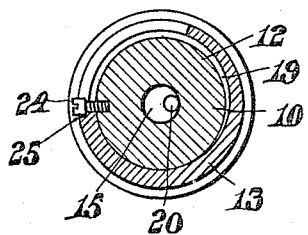

Of the drawings: Figure 1 represents an elevation of a nozzle embodying the features of the present invention. Fig. 2 represents a vertical section of the same, and Fig. 3 represents a transverse section, the cutting plane being on line 3—3 on Fig. 2.

Similar characters designate like parts throughout the several figures of the drawings.

In the drawings, the inner member 10 is preferably made of brass and is provided with a threaded end 11 by which the nozzle may be secured to a pipe, hose, or other tubular member. The inner member 10 is provided with an annular screw threaded flange 12 to which is threaded the outer member 13 (as shown in Fig. 2) said outer member 13 being provided with an elongated nose 14. The inner member 10 has a central passage 15 extending partially therethrough. Within a chamber 16 within the outer member 13 is positioned a packing 17 retained in position by the gland 18 threaded thereto and adjustable therein. This packing 17 prevents all chemicals and water from passing to the threads 19 between the inner member 10 and outer member 13. The passage 15 in the inner member 10 has an outlet 20 therefrom at one side of the axis of said inner member 10 and its central passage 15 and the outer member 13 is provided with a discharge passage 21 extending through the nose 14 and adapted to be alined with the outlet 20 when said outer member 13 has been turned into its open position, as indicated in Fig. 2.

Between the outer member 13 and the outer end of the cylindrical hub 22 of the inner member 10 is interposed the perforated disk 23 preferably of hard rubber. When the outlet 20 and passage 21 are alined there is considerable space between the disk 23 and the end of the hub 22 but when the outer member 13 is moved about its axis relative to the inner member 10 the passage 21 is moved out of alinement with the outlet 20 and at the same time the disk 23 is brought into close contact with the end of the hub 22 thereby preventing all chance for leakage of the liquids passing through the nozzle. The hub 22 accurately fits a chamber within the outer member 13, as shown in the drawings. A stop pin 24 is provided to limit the movement of the outer member 13 relative to the inner member 10 in opening the valve, a shoulder 25 on the outer member 13 being provided as a limiting stop.

The packing 17 is located as near as possible to the end of the hub 22 in order to reduce to a minimum the surface liable to be affected by contact with the chemicals to be discharged from the nozzle. The liability of the valve sticking is almost entirely overcome when the nozzle is constructed as shown and described herein.

The movement of the outer member 13 relative to the inner member 10 in closing is limited by the contact of the disk 23 with the end of the hub 22. As this disk 23 is of hard rubber and the end of the inner member 10 contacting therewith is of brass there is no opportunity for the chemicals to cause an adherence between the two.

It is believed that the operation and many advantages of the invention will be fully understood from the foregoing description.

Having thus described my invention, I claim:

1. In a nozzle, the combination of an inner member provided with an outlet at one side of its axis and having a threaded flange and a cylindrical hub; an outer member secured to said inner member by said threaded flange and rotatable thereon, said outer member fitting over said cylindrical hub and having a chamber surrounding said hub, the wall of which is screw threaded; an annular packing in said chamber; a gland bearing on said packing and adjustable on said thread; and a nose on said outer member provided with a discharge passage offset from the axis of said inner member and adapted to register with the outlet thereof when said members are moved relative to each other.

2. In a nozzle, the combination of an inner member provided with a screw thread and a cylindrical hub, an outer member bored to fit the hub and provided with a complemental screw thread, means for controlling the flow of liquid by the rotation of the outer member, a packing ring to prevent the passage of liquid between the hub and the bore of the outer member, and a gland therefor having a screw thread connection with the outer member.

In testimony whereof I affix my signature.

ARTHUR HUSTUS.

Witnesses:
  HARRY A. GLAZIER,
  MARTHA IRVING.

Copies of this patent may be obtained for five cents each, by addressing the "Commissioner of Patents, Washington, D. C."